UNITED STATES PATENT OFFICE.

JOHN HOWARD KYAN, OF CHELTENHAM, COUNTY OF GLOUCESTER, ENGLAND.

IMPROVED MODE OF PRESERVING TIMBER AND OTHER VEGETABLE SUBSTANCES FROM DECAY.

Specification forming part of Letters Patent No. 800, dated June 23, 1838.

*To all whom it may concern:*

Be it known that I, JOHN HOWARD KYAN, late of South Row, Euston Square, in the county of Middlesex, and now of Cheltenham, in the county of Gloucester, in the Kingdom of Great Britain, esquire, have invented a new and useful Mode of Preserving Certain Vegetable Substances from Decay; and I, the said JOHN HOWARD KYAN, do hereby declare the nature of my said invention to consist in destroying the tendency of certain vegetable substances to decay by submitting that matter contained in them which most promotes it to the action of deutochloride of mercury; and I, the said JOHN HOWARD KYAN, do hereby describe the manner in which my said invention is to be performed or carried into effect by the following description thereof—that is to say—

Having prepared or constructed a large tank or reservoir, of wood or other suitable material, I fill it about two-thirds full of deutochloride of mercury, or as it is more commonly called "corrosive sublimate," dissolved in hot or cold water, or both, in the proportion of one pound of corrosive sublimate to five gallons of water, and into the liquid I put the vegetable substances to be acted upon, and keeping them completely covered by the liquid, steep them for various periods, from fourteen to twenty-one days, according to the nature of the substances to be acted upon.

The certain vegetable substances hereinbefore alluded to are as follows—that is to say, all kinds of wood or timber used for ship or other building, as also for carpenters, wheelwrights, turners, and cabinet work, and these will require to be steeped in the liquid from fourteen to twenty-one days, according as the wood is more or less porous, and difficult of entrance, for the liquid the most porous requiring the least time.

I claim as my invention—

The preserving from decay the certain vegetable substances hereinbefore described, by immersing and saturating or by steeping or soaking the same in or with a solution of corrosive sublimate and water; and such my invention being to the best of my knowledge and belief entirely new and never before used within the United States of America, I do hereby declare this to be my specification of the same, and I do hereby claim to maintain exclusive right and privilege to my said invention.

JOHN HOWARD KYAN.

Witnesses:
    FRANCIS B. THOMAS,
*Solicitor, 144 Leadenhall street, London.*
    H. MASTERMAN,
*Clerk with Messrs. Kearsey, Hughes and Thomas, 144 Leadenhall street, London.*